(12) United States Patent
Weigl

(10) Patent No.: US 6,882,288 B2
(45) Date of Patent: Apr. 19, 2005

(54) AIRCRAFT SECURITY SYSTEM TO PREVENT MANUAL FLIGHT OPERATION BY UNAUTHORIZED INDIVIDUALS

(76) Inventor: Adolf Weigl, 1725 Fessler St., Englewood, FL (US) 34223

( * ) Notice: Subject to any disclaimer, the term of this patent is extended or adjusted under 35 U.S.C. 154(b) by 130 days.

(21) Appl. No.: 10/358,016

(22) Filed: Feb. 3, 2003

(65) Prior Publication Data

US 2004/0021581 A1 Feb. 5, 2004

Related U.S. Application Data

(63) Continuation-in-part of application No. 09/972,018, filed on Oct. 4, 2001, now abandoned.

(30) Foreign Application Priority Data

Sep. 19, 2001 (DE) .......................................... 101 46 170
Sep. 17, 2002 (EP) ............................................ 02020587

(51) Int. Cl.[7] ............................................. G08B 21/00
(52) U.S. Cl. ........................ 340/945; 340/963; 340/5.8; 340/5.81; 340/5.82; 340/5.83
(58) Field of Search ................................ 340/945, 963, 340/964, 426.1, 426.11, 426.12, 5.8, 5.81, 5.82, 5.83, 5.84

(56) References Cited

U.S. PATENT DOCUMENTS

| | | | |
|---|---|---|---|
| 4,993,068 A | 2/1991 | Piosenka et al. | |
| 5,479,162 A | 12/1995 | Barger et al. | |
| 5,812,067 A | 9/1998 | Bergholz et al. | |
| 5,862,247 A | 1/1999 | Fisun et al. | |
| 5,933,098 A | 8/1999 | Haxton | |
| 5,973,731 A | 10/1999 | Schwab | |
| 6,100,811 A | 8/2000 | Hsu et al. | |
| 6,658,572 B1 * | 12/2003 | Craig | |

FOREIGN PATENT DOCUMENTS

| | | | |
|---|---|---|---|
| DE | 10150661 A1 | 10/2001 | |
| EP | 0 885 411 B1 | 12/1998 | |
| FR | 2584842 A1 | 1/1987 | |
| GB | 2322956 A | 9/1998 | |
| WO | WO 3035475 A1 * | 5/2003 | ........... B64D/45/00 |

* cited by examiner

*Primary Examiner*—Toan N. Pham
(74) *Attorney, Agent, or Firm*—Christie, Parker & Hale, LLP (57) ABSTRACT

A security system having a detector to detect specific physical characteristics, such as for example the weight of the pilot, is disclosed. The security system further includes a device to prevent activation of manual flight operation or to switch from manual to automatic flight operation or to deactivate manual flight operation, if the detected physical characteristics do not match predefined physical characteristics. By inputting a personal code into an inputting device the pilot may identify himself as an authorized operator at any time with regard to the security system.

28 Claims, 4 Drawing Sheets

AIRCRAFT SECURITY SYSTEM TO PREVENT MANUAL FLIGHT OPERATION BY UNAUTHORIZED INDIVIDUALS

CROSS-REFERENCE TO RELATED APPLICATION(S)

This application claims priority of European Patent Application No. 02020587.8EP, filed Sep. 17, 2002 and is a continuation in part of U.S. patent application Ser. No. 09/972,018, (abandoned) filed Oct. 4, 2001 which claims priority to German Patent Application No. 101 46 170.4, filed Sep. 19, 2001, the contents of all of which are incorporated herein by reference.

BACKGROUND

The present invention is generally related to a security system for the control of an aircraft, and more particularly related to a security system to prevent unauthorized flight operation of a civil passenger or freight aircraft.

The terror strikes carried out recently with civil commercial airliners in the USA have triggered an intense discussion about how such strikes can be prevented in the future by technical means. It is necessary to prevent aircraft hijackers who are capable of controlling the aircraft from gaining control of the aircraft in order to fly it to a target selected by them and to cause disastrous destruction by intentional impact.

Improved security of the cockpit of the aircraft is being discussed as a possibility for improving security. In particular, a lockable cockpit door that can be unlocked only by special measures and/or only at specific times is being considered. This approach is, however, considered unsatisfactory in practice for various reasons. For one thing, the possibilities for evacuation of the aircraft essential in an emergency are reduced since, for the passengers or the crew, the way through the cockpit into the open is no longer readily available. For another, a locked cockpit door is of only limited use if aircraft hijackers located in the passenger compartment force the pilot to unlock the cockpit door by the threat of force against the passengers and the crew.

Consequently, it would be advantageous to provide a technical device to reliably prevent the control and steering of an aircraft by unauthorized individuals.

SUMMARY OF THE INVENTION

A security system for the control of an aircraft switchable between automatic and manual flight operation includes detection means to detect physical characteristics of individuals and prevention means to prevent the activation of manual flight operation or to switch from manual to automatic flight operation or to deactivate manual flight operation, if the physical characteristics detected by the detection means do not match predefined physical characteristics.

A control system for an aircraft switchable between automatic and manual flight operation includes a processing device for entering the coordinates of a destination, a security system having detection means to detect physical characteristics of individuals is coupled to the processing device and prevention means coupled to the processing device prevents the activation of manual flight operation or a switch from manual to automatic flight operation or the deactivation of manual flight operation, if the physical characteristics detected by the detection means do not match predefined physical characteristics.

A process to prevent manual control of aircraft by unauthorized individuals, includes detecting specific physical characteristics of an operator and preventing manual flight operation, if the physical characteristics detected do not match pre-determined physical characteristics.

BRIEF DESCRIPTION OF THE DRAWINGS

In the following, an exemplary embodiment of the security system according to the invention is explained in detail with reference to the drawings. They depict.

DETAILED DESCRIPTION OF THE INVENTION

In many of today's passenger and freight aircraft, primary flight control systems that are supplied with electrical signals and usually referred to as "fly-by-wire" flight controls are used. Such electrical/electronic systems have converter elements that convert the mechanical movement generated with the control devices located in the cockpit (wheel, stick, and pedals) into electrical pulses. These are merged via electrical connecting lines in a central flight computer and are fed from there in turn via electrical connecting lines to the control surfaces of the aircraft (ailerons, elevators, rudders). The electrical connecting lines leading to the control surfaces are connected to electrical-mechanical converters in which the electrical pulses are transformed into mechanical movements to drive the control surfaces.

In addition, in one embodiment destination coordinates and the like may be entered into an autopilot-primary flight computer. When the autopilot is activated, by means thereof, either the control devices themselves, which are located in the cockpit are moved, positioned, and stopped or downstream mechanical elements decoupled from the control devices are moved, positioned, and stopped or. In any case, upon activation of the autopilot, manual control of the aircraft by operation of the control devices located in the cockpit is no longer possible.

The above described "fly-by-wire" control system with additional autopilot is described, for example, in the European patent EP 0 885 411 B1, which is incorporated herein by reference.

An example aircraft takeoff-landing sequence may for example include the following process steps—presented in a simplified matter (without consideration of the aircraft's power package).

1. Main switch set on ON
2. Input of destination coordinates autopilot
3. Autopilot set on OFF
4. Manual control set on ON
5. Take-off 6. Switch autopilot from OFF to ON→(flight)
7. Switch autopilot from ON to OFF
8. Landing, manual
9. Main switch set on OFF.

There are usually three possibilities for switching the autopilot on or off (not for its programming). For one, the autopilot apparatus itself, which is typically located between the pilot and copilot at roughly head level, has a main switch which can be activated by the pilot with his right arm, or by the copilot with his left arm. There is also one button switch each on two yokes, the so-called "emergency-button". This button is actually only needed, if the pilot fears, for instance, a mid-air collision with another aircraft and an extremely quick change of the existing course is required. Pushing this button disengages the autopilot within fractions of seconds.

An exemplary embodiment of the present invention enables manual flight operation only under compliance with specific predefined and electrically/electronically verifiable conditions. These conditions are such that in a given situation virtually only the pilot is capable of switching the control system into manual flight operation and maintaining this state.

The security system according to the invention ensures that in the event of noncompliance with the conditions, activation of manual flight operation is prevented; or in the event of manual operation already activated, switching from manual to automatic operation or deactivation of the manual flight operation is carried out.

In one embodiment, the conditions for initiating manual flight operation are defined by specific physical characteristics, which can be represented in practice and in a given situation only by the pilot and which are continuously monitored. Specific physical characteristics of the pilot must, consequently, be stored in some form and compared in a given situation with physical characteristics of an operator, whereupon the flight computer may decide whether or not manual flight operation can be enabled for the operator.

It is assumed that in a hijack situation, that is, in a situation in which the pilot is physically removed from his seat, specific physical characteristics are significantly altered at least briefly from the stored physical characteristics. For example, after the pilot has been removed from the pilot seat, no appreciable weight is applied to the seat in question until the hijacker sits in the pilot seat with the intention of guiding the plane by manual control to a target of his own selection. Thus, in the simplest case, the means for detection of physical characteristics may be provided by a weight sensor that is capable of recognizing the presence of a minimal weight, such as, for example, 50 kg.

In an exemplary embodiment, it is sufficient for the weight to drop below the predetermined weight (i.e. 50 kg) for only fractions of a second to activate the security system. The weight sensor is by way of example, a mechanical or hydraulic pressure switch. In one embodiment the means of preventing activation of manual control is provided by one or a plurality of relays or other electrical, electronic or electromagnetic switching devices that are in each case directly connected in the control current of each of the switches (see above) provided for the switching from automatic control to manual control. In practice, one relay each is connected on the two yokes as well as one relay in the main apparatus of the autopilot connected directly into the control current downstream from the switch. The relays are each connected to the two weight sensors of the pilot seat and the copilot seat and are all activated when they receive a corresponding activating signal from a weight sensor, thus making it no longer possible to use any switch to change from autopilot to manual control.

In an exemplary embodiment, the relays are not powered by the existing electrical system on board, but by an independent power supply, such as a 12-volt battery which can, in turn, be supplied or recharged by the on-board electrical system. The displays for the personal code input by the pilots that will be further explained below are also connected to this independent (battery) circuit.

In one embodiment, the weight or pressure sensor referred to above is also designed such that it detects an upper weight limit, for example, 150 kg which if exceeded likewise triggers a function to prevent the switching from autopilot to manual flight operation. This prevents a situation, where, for example, the hijacker, with knowledge of the security system, first also places himself onto the pilot seat and only thereafter attempts to remove the pilot from the seat, such that the weight does not drop below the minimum encoded in the weight sensor, but a certain weight maximum is exceeded. In an exemplary embodiment, the weight thresholds with the weight sensors of the type described (single or double function) are by way of example selectable and adjustable such that dropping below or exceeding the selected weight thresholds always triggers the function of the switch and thus actuates the relay to close or open the autopilot switch circuit.

Typically before flight operations, the pilot and the copilot each enter, via an input device (which is by way of example provided with its own display), their respective personal code with which they can identify themselves for the switching from autopilot to manual flight operation later during flight operations. Before voluntarily leaving the pilot seat, the pilot can again enter his or her personal code into the input device in order to confirm the normalcy of the flight process. It may also happen that the pilot from time to time makes movements that result in the drop in weight to below the lower weight limit causing the weight sensor to trigger the security system. In one embodiment the system communicates this to the pilot—visually or acoustically—to require the pilot to re-identify him or herself by entering his or her personal code. The input devices are by way of example designed such that they deactivate the security system again, when the correct code is entered by the pilot or the copilot, possibly by resetting the relays into their original position. The two input devices for the pilot and the copilot are also supplied by the circuit of the independent battery.

In one embodiment, the means for the prevention of activating manual flight operations is provided with three relays, each of which is connected to both the weight sensors of the pilot seat and the copilot seat. In this even if, for any reason whatsoever, two of them fail to function, one of them will still be able to prevent the switchover from autopilot to manual flight operations.

In general, depending on the design of the security system, the apparatus used to prevent switchover from autopilot to manual flight operations is, by way of example, provided by the detection apparatus itself. For instance, weight sensors, or the above mentioned input device or components contained therein such as a processor or comparator, or a plurality of the previously mentioned devices in cooperation with circuits can interrupt a switchover from autopilot to manual flight operation.

In principle, with weight sensors, only the maintenance of a weight range is monitored. The conditions for activation of the manual flight operations, as provided in accordance with the invention are also provided by specific physical characteristics, which, in practice and in a given situation can be presented only by a specific pilot. Since, in this variant, it is a matter of specific physical characteristics of the pilot, they are stored in some form and compared in a given situation with physical characteristics of an operator, whereupon a computer or processor decides whether or not manual flight operation can be enabled for the operator.

In one embodiment the flight computer decides whether or not manual flight operation can be enabled for the operator. In this embodiment the flight computer or processor is connected to an autonomous power supply such as a battery to ensure uninterrupted performance. In addition, like the weight sensors, the unit performing the comparison is connected to the relays of the autopilot-manual flight switchover circuitry of the above exemplary embodiment, in order to activate it and thus prevent switching if the comparison reveals that the physical characteristics of the operator do not match the stored characteristics.

In an exemplary embodiment of the present invention the physical characteristics of the pilot may be stored before takeoff of the aircraft in a memory unit of the autonomous security system or if desired in the flight computer. In one embodiment these characteristics are stored in digital form on a diskette and entered into the flight computer before the take-off of the aircraft. However, in an alternate embodiment the physical characteristics of the pilot are, by way of example, detected during a so-called initialization phase before take-off of the aircraft using appropriate sensor devices. The physical characteristics determined by the sensor devices are then transmitted to the memory unit of the autonomous security system or the flight computer.

In an exemplary embodiment, the physical characteristics are determined by the weight of the pilot on the pilot seat. In one embodiment, a lower weight limit or a weight range between a lower and upper weight limit is established prior to take-off. The described exemplary system then detects, by way of example, a deviation from these tolerances by means of a weight sensor. In another embodiment the physical characteristics are determined by the actual weight of the pilot. Since the weight of an individual is variable over the course of time, it is advantageous in this case to determine the weight of the pilot during the initialization phase before the take-off of the aircraft. In this embodiment a scale is coupled to the pilot's seat to determine the weight of the operator sitting in the pilot's seat.

In an exemplary embodiment, the detected weight is then electronically communicated to the flight computer for storage therein. Thus, before the take-off of the aircraft, the weight of the pilot is measured and stored in the flight computer. If, subsequently, manual flight operation is to be activated, the weight on the seat scale is again detected and compared with the previously measured and stored weight of the pilot.

If the values to be compared differ by only a predefined tolerance range, the manual flight operation is enabled. However, in an exemplary embodiment, if the weight values to be compared differ by more than the tolerance range, switchover to manual flight operation is blocked.

Thus, provision is, by way of example, made in the security system that not only a blocking of the switchover from automatic to manual flight operation is enabled, but also that during manual flight operation, the current weight of the operator on the seat scale is measured at specific time intervals, possibly averaged over several measured values, and compared with the stored value. If the deviation thus determined is significantly greater than the aforementioned tolerance range, the preset manual flight operation is deactivated and the system is, by way of example, returned to automatic flight operation (autopilot).

An embodiment of the present invention thus makes it possible to prevent hijacker(s) from taking over control of the aircraft after removal of the pilot and the copilot and thereafter attacking a target of their own choice under manual control. The hijackers will, as a rule, have no one among them who has approximately the same weight as the pilot. Consequently, when one of the hijackers sits in the pilot's seat after removal of the pilot, the security system according to the invention determines that his or her weight deviates significantly from the stored value of the weight of the pilot and then rejects the transition to manual flight operation. In addition, if manual flight operation has already been set and the hijacker sits down in place of the pilot in the pilot's seat to control the aircraft periodic measurements of the weight of the highjacker determine after a short time that the highjackers weight does not match the stored weight value for the pilot and, as a result, a command is triggered whereby manual flight operation is terminated and the system returns to automatic flight operation, i.e., to the autopilot state.

Obviously, it must under all circumstances be prevented for a manual operating state set by the pilot to be left because of the system and for a change to the automatic operating state to be made. Due to posture related shifts in the weight of the pilot in the pilot's seat, it may, for example, occur that from time to time an incorrect weight is measured and communicated by the seat scale. This can be countered in that the weight is measured repeatedly at regular time intervals and is averaged over a plurality of measured values. In addition, or alternatively, it is also possible to wait a specific amount time before a decision concerning the switchover, until it is determined with certainty that the weight has significantly changed.

Virtually all existing aircraft can be controlled manually only from the sitting position in the pilot's seat. If the pilot remains in the pilot's seat, a switchover into the manual operating state based on a correct weight determination is, to be sure, possible; however, for manual control by an unauthorized individual, the pilot need be removed from the pilot's seat and the unauthorized individual must assume a sitting position therein. For the reasons already described, the described exemplary security system then returns automatically from the manual operating state to the autopilot state.

The security system according to the invention leverages existing autopilot systems that are widely available in commercial aircraft. However, it is not necessary that a "fly-by-wire" control be present. In principle, the described exemplary security system is appropriate for use in aircraft without such electrical/electronic control.

An exemplary system also provides for the possibility that one of the two pilots may be unable for natural reasons (nausea, heart attack) to perform his or her duties during the flight and possibly may even have to leave the pilot's seat. In such an emergency situation, the remaining pilot then needs to execute the flight and/or landing process alone. In an exemplary embodiment of the present invention the secret code of the two pilots originally entered at the beginning of flight preparation enables the activation of the autopilot even without permanent occupation of the seat. It is assumed that in the event of a hijacking, a pilot who is still possibly alive and in the cockpit would not voluntarily betray the code to the hijackers and thus yield control of the aircraft completely to the hijackers.

In addition, during the take-off and landing phase of an exemplary security system, i.e., during phases in which the aircraft is in the manual operating state, the separating doors between the cockpit and passenger compartment are automatically locked from the inside, to thus permit no access to the cockpit during these periods.

One of skill in the art will appreciate that the described exemplary security system can utilize any of a number of the physical characteristics of the pilots and is not therefore limited to just the body weight of the pilot. For example, other identifying physical characteristics include the iris of the eye, the voice of the pilot, or even his fingerprint and/or handprint.

For example, in one embodiment the pilot's iris can be recorded by an appropriately positioned video recording device (camera) and stored in an image file of the storage device of the flight computer. Then, if, subsequently, a switchover from automatic flight operation into manual flight operation is to be carried out, the iris of the operator who gave the order for the switchover to manual flight operation by actuation of the autopilot/manual toggle can be detected by one and the same camera. Then, an image file accordingly generated can be compared with the previously stored image file and the manual operation of the aircraft is permitted or prevented in accordance with the result of the comparison.

In addition, in an exemplary embodiment, if the manual operating state has already been set, the iris of the operator can be subsequently detected at regular time intervals and likewise compared with the stored data. Here again, a switchover into the manual mode of operation either does not occur or the system switches back from the already set manual mode of operation into the autopilot mode as soon as there are significant differences in the data to be compared.

In another embodiment the physical characteristics are provided by the voice of the pilot. However, in this case continuous monitoring during a preset manual operating state is somewhat problematic since the pilot would theoretically have to continually give voice samples to prove his authorization to the system.

In another embodiment, the physical characteristics comprise a fingerprint and/or a handprint of the pilot. However, the problem also exists here that the pilot would have to continually position a finger or hand at specific time intervals to prove his authorization.

In addition, a plurality of the previously mentioned physical characteristics could be combined, whereby corresponding different detection means are provided to detect the corresponding physical characteristics.

One of skill in the art will thus appreciate that the present invention is not limited to a particular physical characteristic of the pilot. Rather, the present invention detects one or a combination of multiple characteristics of the pilot to prevent the activation of manual flight operation or switchover from manual to automatic flight operation or to deactivate manual flight operation in the event the characteristics sensed by the detection apparatus do not match the predefined physical characteristics.

Depending on the type of physical characteristics to be detected and compared, the detection apparatus comprises, by way of example, a weight sensor, i.e. a scale integrated into the pilot's seat, an image recording device such as a camera, a microphone, or a fingerprint and/or handprint sensor for a combination of a plurality of the aforementioned devices. A mechanical or hydraulic pressure switch need not necessarily be arranged in or under the pilot seat. In particular, if the weight on the pilot seat puts pressure on a liquid in a small tube, the actual switch is, by way of example, located outside of the pilot seat.

In one embodiment the means to prevent activation of the manual flight operation are electronically coupled to the detection apparatus and are provided in a simple manner by simple relay circuitry or in a more complicated manner by a computer or processor unit with storage and comparison devices. In one embodiment this includes a storage device to store data of physical characteristics as well as a comparison device to compare stored data of physical characteristics with current measurements of the physical characteristics. An exemplary embodiment may link an additional device for activation/deactivation of the autopilot operating state with these devices.

Figure 1:
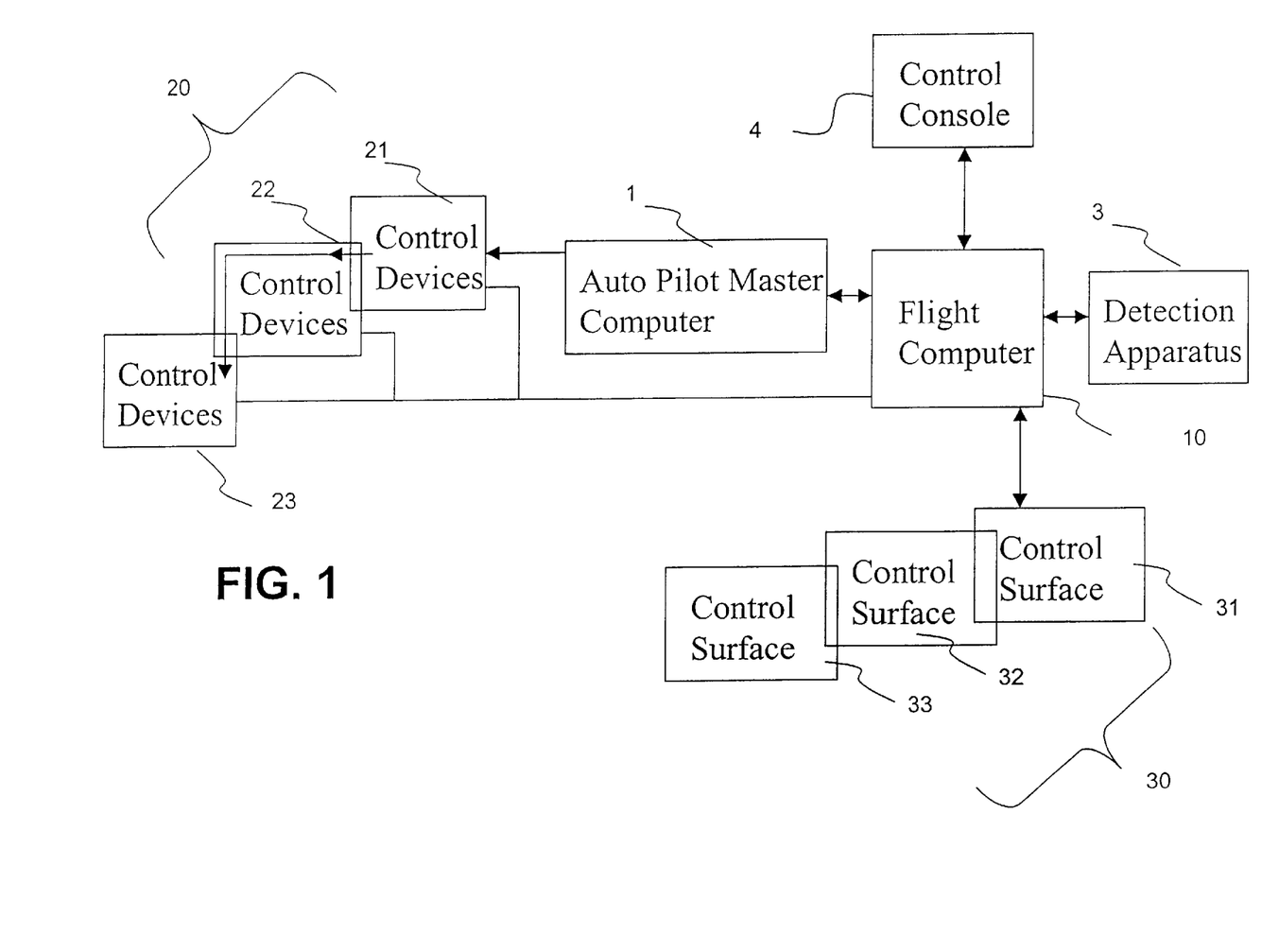
FIG. 1 is a schematic block diagram of an electronic "fly-by-wire" control system of an aircraft, which includes a security system according to an exemplary embodiment of the present invention.

FIG. 1 depicts a block diagram representing the principle components of an electronic "fly-by-wire" flight controller, as is currently present in many commercial aircraft. In the pilot's cockpit, control devices with which the pilot operates the control surfaces of the aircraft are located. At his seat, the copilot has available the same control devices, which are mechanically linked with those of the pilot via a servo rod.

Typically, there are three control devices with which the aircraft can be moved around the three orthogonal axes. By rotating the wheel, the aileron attached to the wings is actuated. By tilting the stick on which the wheel is attached, the elevator is actuated. And finally, the rudder is moved by means of the pedals.

In "fly-by-wire" control systems, the mechanical movement of the control devices is converted by mechanical-electrical converters (not shown) into electrical pulses, which converge in a flight computer 10 and are forwarded from there to the various control surfaces. There they are converted by electrical-mechanical converters (not shown) into mechanical movements to drive the control surfaces.

In most aircraft, an autopilot-master computer 1 is also provided, which is either part of the flight computer 10 or is connected to the flight computer 10 as an independent data processing module. The destination coordinates of a destination to be flown to, as well as other data such as air route, flight corridor, and altitude, can be entered into the autopilot-master computer 1. When the autopilot master computer 1 is activated by the flight computer 10, it ensures, on the basis of these input data, that the control devices 20 are guided such that the aircraft maintains a desired air route. The actual geographic position of the aircraft is, by way of example, determined at specific time intervals by a compass system or by the global positioning system (GPS) and fed to the autopilot-master computer 1, whereupon it issues appropriate commands to change the position of the control devices 20. In the event of activation of the autopilot-master computer 1, the control devices 20 can no longer be operated manually by the pilot.

In addition, additional operator functions, switch elements, and visual displays that are schematically depicted in the form of the control console 4 that is connected with the flight computer 10 are available to the pilot.

In an exemplary embodiment of the present invention a detection apparatus 3 is coupled to the flight computer 10. In the already described preferred embodiment of the invention, the detection apparatus 3 comprises, by way of example, an electronic scale incorporated into the pilot's seat, by which the weight of the operator sitting in the pilot's seat can be determined and forwarded to the flight computer 10. Provision is made that by means of suitable software control of the flight computer 10, the weight is continuously determined at specific time intervals and is transmitted to the flight computer 10. This state of a continuous weight measurement is, by way of example, activated in particular when the autopilot-master computer 1 is deactivated, i.e., manual flight operation is set. In this case, it is significant to continually monitor whether the operator performing the manual flight operation has the necessary authorization for this, whether, consequently, the operator has a body weight determined by the detection apparatus 3 that corresponds to the body weight of the pilot.

Figure 2:
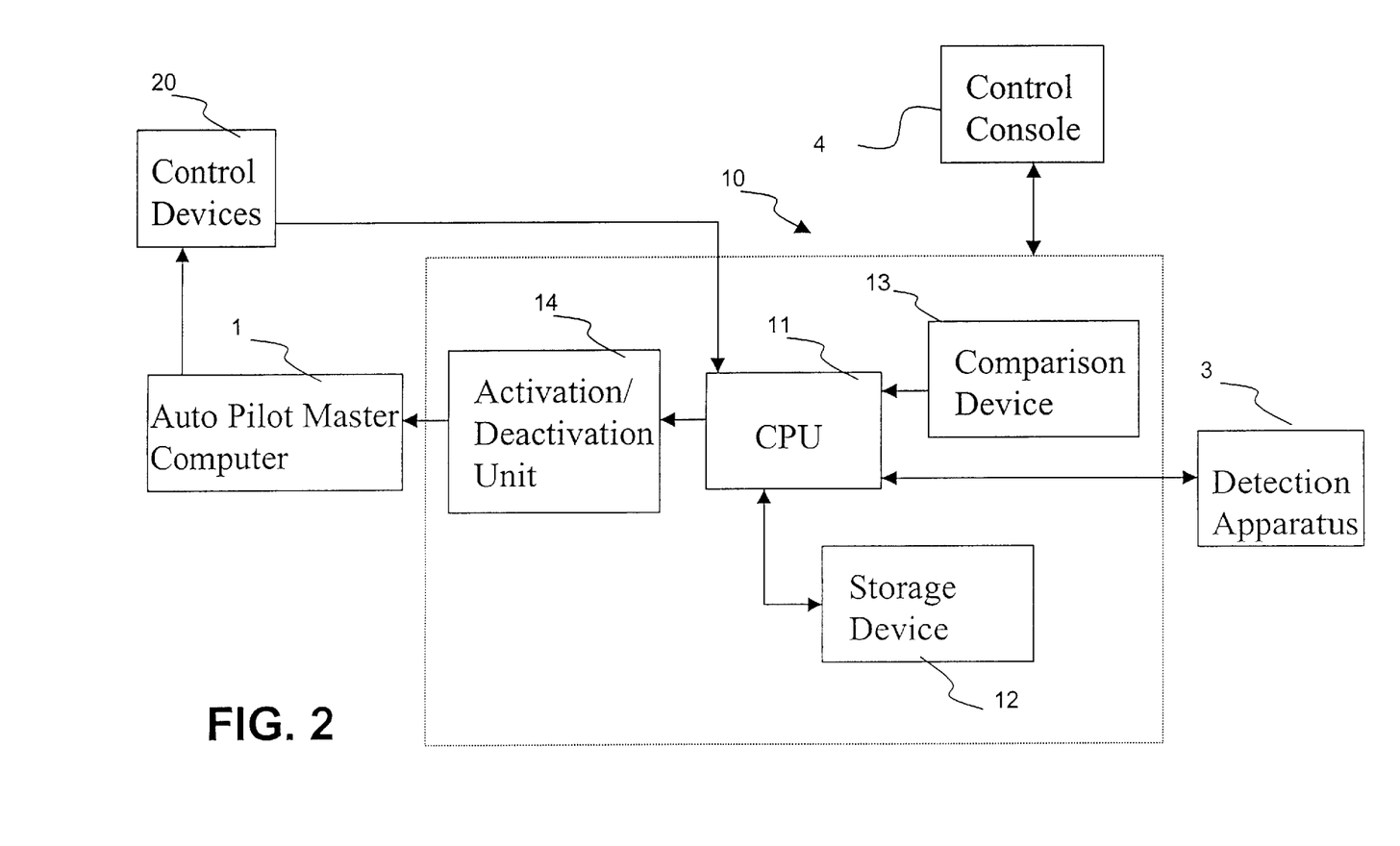
FIG. 2 is a schematic block diagram of a security system according to an exemplary embodiment of the present invention included in the control system.

FIG. 2 is a simplified block diagram of the principle components of a fly-by-wire flight control system that illustrates the communication of the various components among each other. The flight computer 10 has a processor CPU 11 through which all procedures and commands are coordinated. A storage device 12 in which personal data concerning the pilot and the copilot can be stored is coupled to the CPU 11. In particular, data and values relative to the physical characteristics of the pilot and the copilot can be stored in the storage device 12. In one embodiment, such data are sensed by the detection apparatus 3 in an initialization phase before takeoff and stored in the storage device 12. In the previously mentioned preferred application, in which the physical characteristics are provided by the body weight of the pilot, the weight of the pilot sitting in the pilot's seat is thus initially determined by the scale integrated into the pilot's seat and written via the CPU 11 into the storage device 12. In an alternate embodiment, the detection apparatus comprises, by way of example, an image detection device, a fingerprint/handprint sensor, or microphone, or the like via which corresponding physical characteristics of the pilot such as the iris of one of the pilot's eyes, the pilot's fingerprint/handprint or the pilot's voice are detected and corresponding data are written into the storage device 12.

In an alternate embodiment, provision is also made that data concerning physical characteristics of the pilot are not detected and read in during an initial initialization phase, but rather taken from an external storage medium or communicated via a radio connection from the outside and are written into the storage device 12.

The CPU 11 is further linked with a comparison device 13, in which data and values concerning physical characteristics sensed by the detection apparatus 3 are compared with such values stored in the storage device 12. In particular when a switch command for the switchover from automatic to manual flight operation is triggered on a switch of the control console provided for this, the CPU 11 prompts a current measurement of physical characteristics such as weight by the detection apparatus 3. In addition, the comparison device 13 compares the currently measured value with the values stored in the storage device 12. Only when the comparison device 13 determines that the values to be compared are identical to each other within a specified tolerance range does it send a corresponding signal to the CPU 11, which thereupon causes an activation/deactivation unit 14 to deactivate the autopilot-master computer 1 such that manual flight operation is activated and the control devices 20 can be operated by the pilot.

When the autopilot-master computer 1 is deactivated, provision is made that measured values of the detection apparatus 3 are requested at specific time intervals and the measured values communicated are compared with the values stored in the storage device 12. As soon as a deviation in the values to be compared is detected, the CPU 11 prompts the activation/deactivation unit 14 to activate the autopilot-master computer 1 to prevent manual flight operation. This can occur, for example, when the measured values delivered by the detection apparatus 3 which in one embodiment are determined over relatively long intervals, such as a few seconds to a minute, are compared with the values stored in the computer.

In an exemplary embodiment, only when there is a specific deviation of the measured values delivered after a specific period of time, is manual flight operation prevented by the CPU 11 and the activation/deactivation unit 14 by activation of the autopilot-master computer 1. This should prevent, in the case of weight measurement, short-term fluctuations of the measured weight as a result of posture-related weight shifts of the pilot from making it impossible for him to be able to continue to perform manual flight operation.

FIG. 2 also depicts an electrical connection line coming from the control devices and connected with the flight computer 10, via which the electrical pulses of the control devices are communicated to the flight computer 10. The flight computer provides that these pulses are prepared appropriately and then forwarded to the control surfaces 30 of the aircraft.

Figure 3:
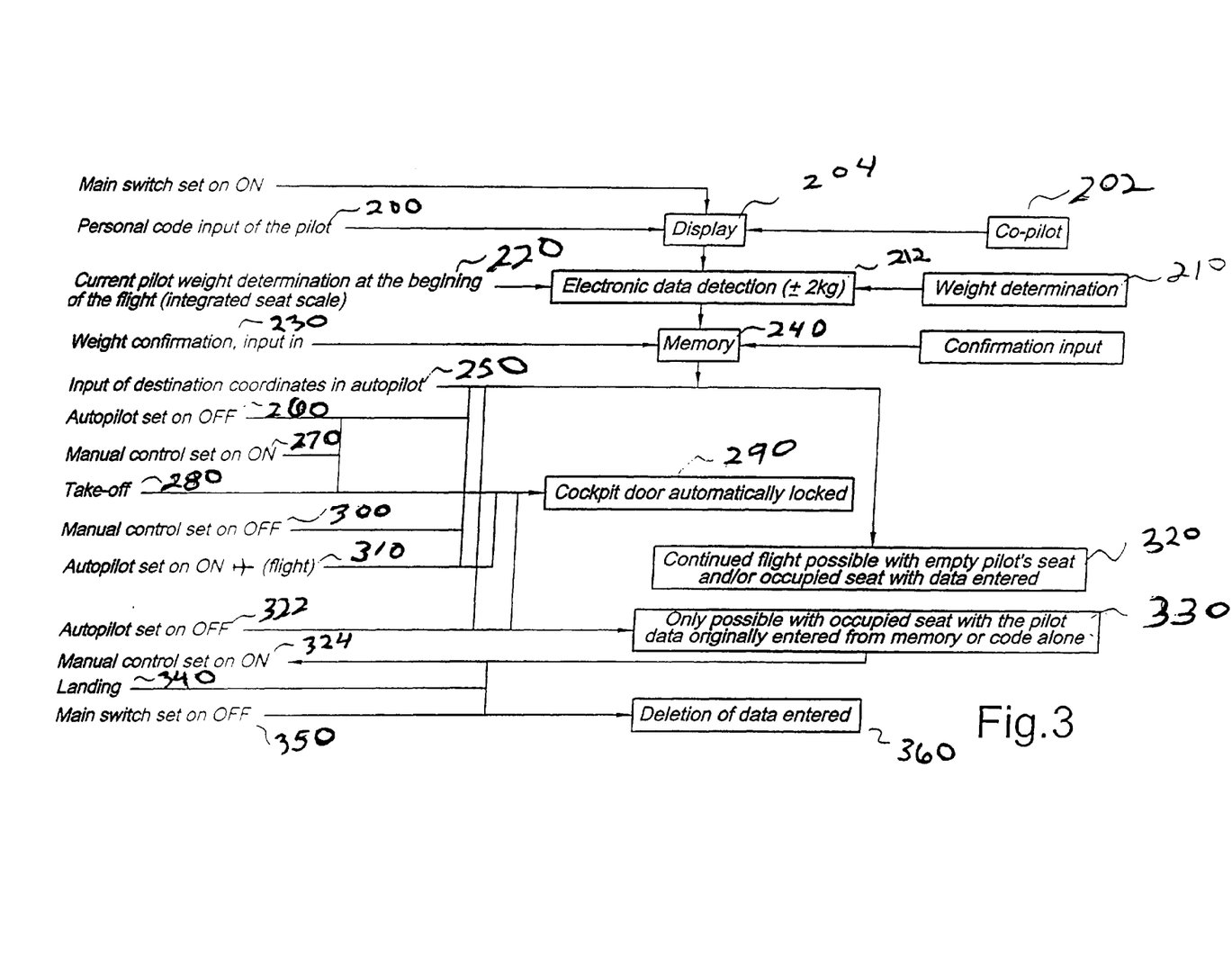
FIG. 3 is a takeoff-landing sequence using a security system according to an exemplary embodiment of the present invention.

An exemplary flow chart for a takeoff-landing sequence using a security system according to the invention is depicted in FIG. 3. In the case of weight measurements 210, the aforementioned tolerance range can be about ±1.5 or ±2 kg 212. In addition, another capability can be present to deactivate the autopilot even without permanent occupation of the seat and to carry out manual flight operation. For example, in one embodiment the secret codes of the two pilots 200 and 202 that are input originally at the beginning of the flight can enable deactivation of the autopilot-master computer. These codes, by way of example are entered via a keypad of the control console 4 or display and verified for correctness by the CPU 11, whereupon it permits the activation/deactivation unit 14 to deactivate the autopilot-master computer 1 (see FIG. 2). This capability is provided for those cases in which one of the two pilots is unable for various reasons to perform his duties in the pilot's seat.

In a normal take-off sequence the destination coordinates are input to the auto-pilot 250 and the auto-pilot set to the off condition 260 and manual control set to the on condition 270 for take-off 280 wherein an exemplary embodiment the cockpit door is automatically locked 290. In an exemplary embodiment, manual control is set to off 300 and auto-pilot set to on 310 during flight if the pilot's seat is empty or if the pilot's seat is occupied and a weight confirmation has been performed 320.

In addition, deactivation of the auto-pilot 322 with manual controls set to on 324 is also possible if the pilot's code is correctly entered into the input device or the pilot remains in the pilot's seat and a weight determination is within the specified tolerance of the stored value 330. In addition, the pilot may land the plane 340 and the flight control computer is, by way of example, switched off 350 and the personal code information deleted 360.

The present invention is not restricted to application in "fly-by-wire" control systems. It can also be used in commercial aircraft in which the control devices in the cockpit are mechanically coupled, i.e., as a rule by cables, directly with the control surfaces of the aircraft. In these control systems, a flight computer is also usually present. However, in the non fly-by-wire control systems it no longer has the task of merging electronic signals from the control devices and forwarding them to the control surfaces. However, even in control systems that are not based on "fly-by-wire" technology, an autopilot that acts on the mechanical devices on the basis of destination data entered and adjusts the control surfaces in a specific manner may be present. Even this autopilot can then be activated and deactivated to switch between automatic and manual flight operation.

Figure 4:
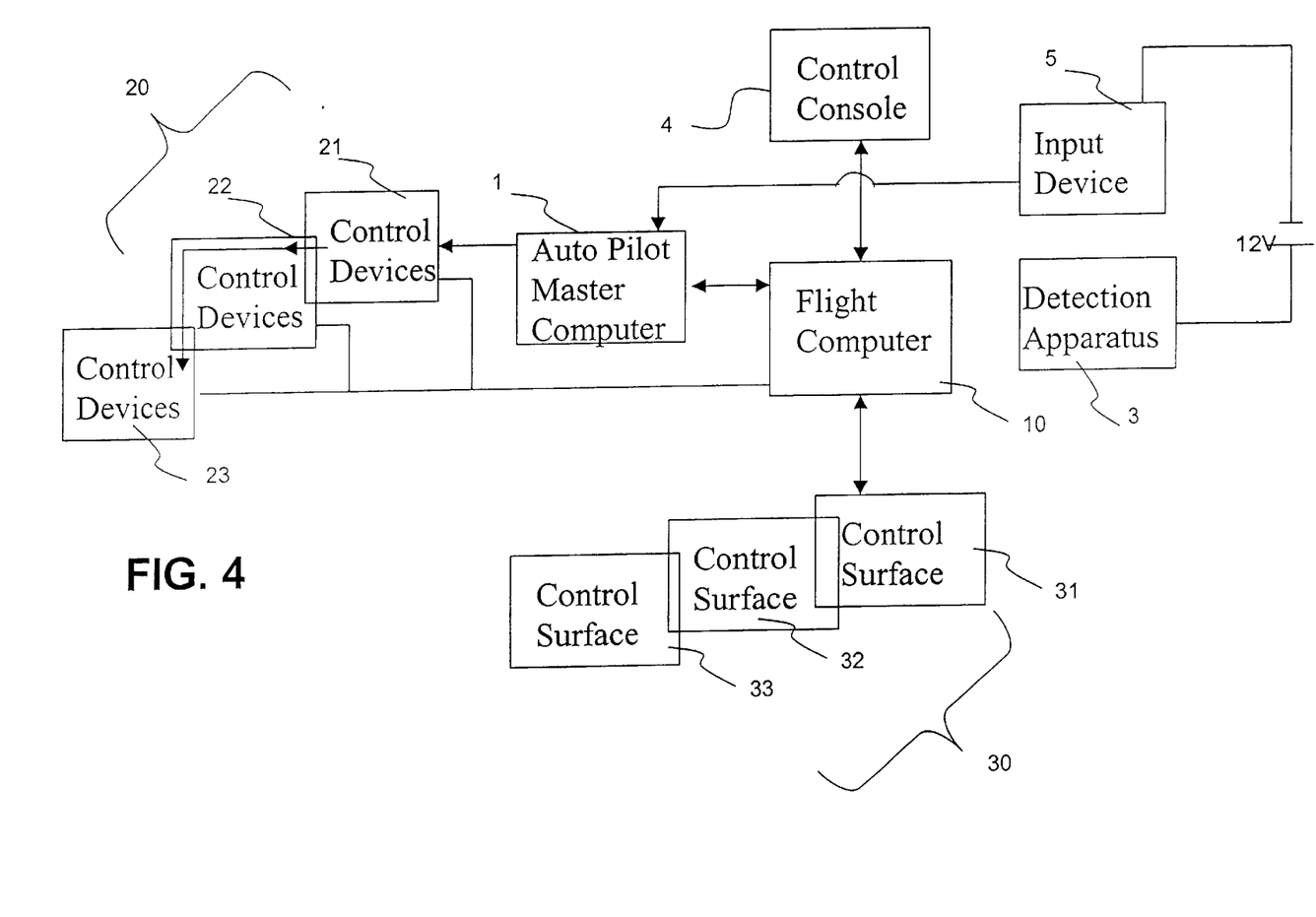
FIG. 4 is a schematic block diagram of an alternate electronic "fly-by-wire" control system of an aircraft which includes a security system according to an exemplary embodiment of the present invention.

The exemplary embodiment of the security system according to FIG. 4 has detection means 3 and an input device 5. In a previously described exemplary embodiment of the invention, the detection means 3 have an electronic scale built into the pilot seat by which the actual weight of the operator seated in the pilot seat can be determined 220 and stored in memory 240 and compared with the stored reference weight 230.

The input device mainly serves to input a code by means of a keyboard or by speech input, whereby the pilot can identify him or herself with regard to the security system. Prior to the flight, the pilot inputs the personal code known only to him or her and later on, after inputting this code again, may, for example, leave the pilot's seat without activating the security system and thus blocking the switchover to manual flight operation. In one embodiment, the input device is equipped with a display 204 for display of incoming data and possibly other information.

In one embodiment, the pilot and the copilot each have such an input device in the form of a hand unit in order to identify themselves with regard to the security system by their own personal codes. Depending on the design of the security system, the input unit is, by way of example, provided with additional functions. For example, in one embodiment, the input device is provided with a storage unit to store individual physical characteristics of the pilot, a comparator and a processor unit. In an exemplary embodiment provisions are made that by means of suitable control by the input device and its components the weight is continuously detected at specific time intervals and evaluated in the input device 5. This condition of continuous weight measurement is, by way of example, activated when the main autopilot computer 1 is deactivated, i.e., a manual flight operation is set. In this case continuous monitoring establishes whether the operator carrying out manual flight operation has the necessary authority to do so, i.e. whether the operator has the body weight detected by a detection means 3 that matches the body weight of the pilot.

In an alternate embodiment of the present invention depicted in the simplified block diagram of FIG. 4, an input device 5 is coupled to the autopilot master computer 1 and in particular with the circuits for the deactivation of the autopilot and the switchover to manual operation. In this embodiment the input device may take over the control of the relays' of the autopilot activation/deactivation circuits based on signals received from the detection apparatus 3. In the described exemplary embodiment the input device or a control device contained therein, such as a processor, is, by way of example, adjusted in such a manner that it does not provide any signal to the relays' if the pilot wants to leave his seat and preventively enters his code into the input device for renewed identification.

In a security system according to the invention configured in such a manner the following process is, by way of example, realized during normal flight conditions. In a normal flight operation from A to B, the autopilot is set to "ON". The pilot would, for whatever reason, like to leave the pilot's seat. Before the pilot moves the seat back, the pilot punches in his or her personal code set on the ground prior to the flight into the input device 5, gets up and leaves the pilot's seat, whereupon, although the weight has changed, the security system does not trigger any measures. In this embodiment the autopilot remains "ON" while the copilot is still seated in the right seat. The security system also does not issue an acoustic warning signal. After the pilot has returned to the pilot's seat, nothing happens initially. Only after a specific presetable time interval, such as a few minutes, an acoustical signal is sounded by the security system to remind the pilot that the pilot's seat was empty for a while and needs to be "re-coded" to confirm the legitimacy of his presence. In accordance with an exemplary embodiment if the pilot then punches his personal code into the input device, the pilot may again leave the position "Autopilot ON" at any time.

In a hijacking, the following events would likely take place. The pilot or the pilots would probably first be asked to leave their seats. Meanwhile, the autopilot is still set on "ON". It is improbable to assume that the pilot or the copilot would input his personal secret code prior to leaving his or her seat. If one of the hijackers, using force or not, takes a seat in one of the pilot seats in order to pilot the aircraft by his or herself, the highjacker is forced to switch off the autopilot. This, however, is no longer possible, as the security system prevents this, because of the brief weight measuring interruption.

An exemplary security system simultaneously sounds an acoustic signal demanding the input of the pilot's code. This is, however, impossible for the hijackers to do; therefore, they cannot effect a switchover to manual flight operation. If no code input takes place immediately after the first acoustic demand signal, the acoustic signal is sounded again after a short time interval and then a third time after an even shorter time interval. If, after this third acoustic demand, no input by at least one of the pilots is carried out, an exemplary security system communicates to the outside world that something is wrong with this aircraft. For example, in one embodiment a small but powerful radio emits a silent emergency signal to the nearest receiver/airport providing data specific to this aircraft alone. To determine the precise position of this aircraft from the ground is no longer a problem and countermeasures can be initiated.

In this embodiment the input device 5 and the detection apparatus 3 are, by way of example, coupled to their own power source such as a 12V battery, thereby providing a security system that is independent from the onboard circuits. As also already disclosed above, the detection apparatus 3, in an exemplary embodiment, comprises relatively simple weight sensors that monitor the maintenance of a lower and possibly an upper weight limit in the pilot's seat. In this case, the weight sensors are coupled directly to the relay circuits of the autopilot master computer 1 and do not need to be connected directly to the input device 5. The latter are, by way of example coupled either to the relay circuits or the connecting line between the relay circuits and the weight sensors to facilitate the already disclosed demanded switching off of the security function by code input by the pilots.

In an exemplary embodiment the relay circuits are, by way of example, designed and coupled to the detection apparatus 3 such that, with manual flight operation already set, an activation of the relays' triggered by the detection apparatus 3 or the input device 5 due to weight irregularities results in a switchover from manual flight operation to autopilot and identification by means of the personal code input is demanded. In this manner, a scenario is prevented where the hijacker or highjackers first force a switching off of the autopilot and subsequently render the pilot defenseless and remove the pilot from the pilot's seat.

However, it is necessary to prevent this switchover from manual flight operation to autopilot-mode from being triggered during normal flight operations, that is, during the manual takeoff or landing by the pilot through unintentional weight shifts. In that regard, the security system is configured in such a way, that the pilot inputs his personal code simultaneously with the switchover from autopilot mode to manual flight operation thus keeps the security system from triggering a reverse switchover with weight irregularities at a later time. In case the hijackers force the pilot or the copilot to surrender the personal code and then switch off the autopilot by entering that code, provision is made that after a specific short time interval, a new code input is demanded by the security system and that the code has a time related changeable part whose properties are not known to the hijackers.

For example, in one embodiment, every personal code has, by way of example, an unchangeable sequence of numbers followed by a changeable sequence of numbers. In one embodiment, the changeable sequence of numbers is, by way of example, the minute interval on a clock with numeral display in the cockpit that is synchronized with a clock integrated in the security system. The hijackers are unaware of this, so that after the time interval, they enter a code that is incorrect and identification fails.

Within the power supply area of the security system, possibly within the input device 5, a storage device is provided in which personally related data regarding the pilot or the copilot are stored. In particular, data and values regarding the physical characteristics of the pilot and the copilot are stored there. In one embodiment, such data is, by way of example, acquired by the detection apparatus 3 and stored in the memory device during the initialization phase before take-off. In the aforementioned exemplary embodiment in which the physical characteristics are provided by the body weight of the pilot, initially the weight of the pilot seated in the pilot seat is detected by the scale integrated in the pilot seat and stored in the memory of the storage device.

Alternatively, the detection apparatus 3 can comprise an image acquisition device, a finger/hand print sensor or a microphone by which the corresponding characteristics of the pilot, such as the iris of one of his eyes, his finger/hand print or his voice are detected and the corresponding data stored in the memory of the storage device 12.

In one embodiment, the physical characteristics of the pilot are taken from an external storage medium or externally transmitted by a radio connection and stored in the memory of the input device 5 rather than being detected by the detection apparatus 3 during an initial initialization phase.

Furthermore, the comparison device may be provided with the power supply area of an exemplary security system, possibly within the input device 5, where the data and values detected by the detection apparatus 3 regarding physical characteristics such as weight can be compared with the data and values that have been stored in the storage device. In particular, in the case when an actual measurement, such as the weight, is detected by the detection apparatus 3 and a comparison by the comparison device with the data stored in the storage device shows that the data to be compared deviates beyond a specific tolerance band width from each other, the comparison device, for instance, provides a corresponding signal to the processor contained in the input device 5 which then addresses the relay circuits of the autopilot master computer 1.

To those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention.

What is claimed is:

1. A system for the control of an aircraft switchable between automatic and manual flight operation comprising:
   detection means to detect physical characteristics of individuals; and
   prevention means for preventing the switching from automatic to manual flight operation or for switching from manual to automatic flight operation, if the physical characteristics detected by the detection means do not match predefined physical characteristics.

2. The security system according to claim 1 wherein the physical characteristics comprise the body weight of an individual, and wherein the detection means comprise a weight sensor.

3. Security system according to claim 2 wherein the prevention means is independent from an electric circuitry of the aircraft and wherein the prevention means is coupled to an autonomous power supply.

4. The security system according to claim 1 wherein the scale is integrated into a pilot's seat of the aircraft as a seat scale.

5. The security system according to claim 1 further comprising storage means to store data about the physical characteristics communicated by the detection means.

6. The security system according to claim 5 further comprising comparison means to compare the data delivered by the detection means with predefined data.

7. The security system according to claim 6 wherein the predefined data is stored in advance in storage means.

8. The security system according to claim 1 wherein automatic or manual flight operation mode is always set.

9. The security system according to claim 8 further comprising an autopilot computer unit and activation/deactivation means to activate/deactivate the autopilot computer unit.

10. The security system according to claim 1, wherein the physical characteristics comprise the iris of an individual and the detection means comprises an image sensor for optical detection of the iris.

11. The security system according to claim 1, wherein the physical characteristics comprise the voice of an individual, and the detection means comprise a microphone and a voice analysis unit.

12. The security system according to claim 1 wherein the physical characteristics comprise a fingerprint and/or handprint of an individual.

13. The security system according to claim 1 wherein the physical characteristics are selected from the group consisting of body weight, iris, voice, fingerprint and handprint characteristics.

14. The security system according to claim 1 further comprising an input device for inputting a personal identification code, whereby the input of the personal identification code effects the deactivation of the prevention means and or the capability to activate manual flight operations.

15. The security system according to claim 14 wherein the physical characteristics comprise body weight of an individual resting on a pilot or copilot seat and the detection means comprise a weight sensor.

16. The security system according to claim 15 wherein the physical characteristics are preset as a lower weight threshold value and wherein the weight sensor relays a signal to the prevention means if the weight falls below the lower weight threshold value.

17. The security system according to claim 16 wherein the physical characteristics further comprise a preset higher weight threshold value and wherein the weight sensor relays a signal to the prevention means if the weight rises above the preset higher weight threshold value.

18. Security system according to claim 14 wherein the prevention means comprise electrical, electronic or electromagnetic switches wherein the switches control switchover between manual and automatic flight operations.

19. Security system according to claim 18 wherein a plurality of change-over switches between manual and automatic flight operations are provided and a relay is coupled to each of the change-over switches.

20. Security system according to claim 19 wherein one the detection means comprises one or more weight sensors and wherein each of the one or more weight sensors is coupled to each of the relays.

21. A control system for an aircraft switchable between automatic and manual flight operation comprising:
 a processing device for entering coordinates of a destination;
 a security system comprising detection means to detect physical characteristics of individuals coupled to the processing device; and
 an activation/deactivation, coupled to the processing device, wherein the activation/deactivation unit prevents activation of manual flight operation or switches from manual to automatic flight operation or deactivates manual flight operation, if the physical characteristics detected by the detection means do not match predefined physical characteristics.

22. The control system according to claim 21 wherein the control system comprises an electronic "fly-by-wire" control system.

23. The control system according to claim 21 wherein the control system is a mechanical control system.

24. A process for controlling of an aircraft switchable between automatic and manual flight operation, comprising:
 detecting specific physical characteristics of an operator or a weight resting on a pilot or copilot seat; and
 preventing the switching from automatic to manual flight operation, or switching from manual to automatic flight operation,
 if the physical characteristics detected by the detection means do not match prespecified physical characteristics or if the weight resting on a pilot or copilot seat falls below a predefined weight value.

25. A system for the control of an aircraft switchable between automatic and manual flight operation, comprising:
 a weight sensor for sensing the weight resting on a pilot or copilot seat, and
 prevention means for preventing the switching from automatic to manual flight operation or for switching from manual to automatic flight operation, if the weight detected by the weight sensor is below a predefined lower threshold value, wherein said weight sensor relays a signal to the prevention means if the sensed weight falls below the lower threshold value.

26. The control system according to claim 25, wherein said prevention means is also adapted for preventing the switching from automatic to manual flight operation or for switching from manual to automatic flight operation, if the weight detected by the weight sensor is above a predetermined higher threshold value, and
 said weight sensor also relays a signal to the prevention means if the sensed weight raises above the higher threshold value.

27. The system according to claim 25, wherein the detection means is adapted for continuously detecting the physical parameters or the weight, respectively, in predetermined time intervals.

28. A system for the control of an aircraft switchable between automatic and manual flight operation comprising:
 a detector detecting physical characteristics of individuals; and
 a device preventing the switching from automatic to manual flight operation or for switching from manual to automatic flight operation, when the physical characteristics detected by the detector do not match predefined physical characteristics.

* * * * *